US009179375B2

(12) United States Patent
Lim (10) Patent No.: US 9,179,375 B2
(45) Date of Patent: Nov. 3, 2015

(54) METHOD FOR CONTROLLING CONNECTION CONFIGURATION BY FEMTO BASE STATION AND METHOD FOR CONFIGURING CONNECTION BY TERMINAL (75) Inventor: Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 13/639,352

(22) PCT Filed: Sep. 28, 2010

(86) PCT No.: PCT/KR2010/006595
§ 371 (c)(1),
(2), (4) Date: Oct. 4, 2012

(87) PCT Pub. No.: WO2011/126186
PCT Pub. Date: Oct. 13, 2011

(65) Prior Publication Data
US 2013/0065600 A1 Mar. 14, 2013

Related U.S. Application Data (60) Provisional application No. 61/321,835, filed on Apr. 7, 2010.

(30) Foreign Application Priority Data

May 25, 2010 (KR) .......................... 10-2010-0048761

(51) Int. Cl.
*H04W 36/00* (2009.01)
*H04W 84/04* (2009.01)

(52) U.S. Cl.
CPC ........ *H04W 36/0066* (2013.01); *H04W 84/045* (2013.01)

(58) Field of Classification Search
CPC ............ H04W 72/04; H04W 36/0066; H04W 36/0061; H04W 36/0055; H04W 84/045
USPC .................. 455/436–437, 450–453
See application file for complete search history.

(56) References Cited

U.S. PATENT DOCUMENTS

| 2003/0218995 | A1 | 11/2003 | Kim et al. | |
| 2006/0234705 | A1 | 10/2006 | Oommen | |
| 2007/0019575 | A1 | 1/2007 | Shaheen | |
| 2011/0053600 | A1* | 3/2011 | Rajasimman et al. | 455/442 |
| 2012/0044824 | A1* | 2/2012 | Osterling et al. | 370/252 |

FOREIGN PATENT DOCUMENTS

| KR | 10-2008-0007588 A | 1/2008 |
| KR | 10-2010-0032269 A | 3/2010 |

* cited by examiner

*Primary Examiner* — Marcos Torres
(74) *Attorney, Agent, or Firm* — Birch, Stewart, Kolasch & Birch, LLP (57) ABSTRACT

Disclosed is a method for controlling connections between a terminal and one or more neighbor base station (BSs) by a serving BS with respect to the terminal. The method for controlling a configuration of connections between a terminal and one or more neighbor BSs includes: receiving, by the serving BS and from a control station, information regarding radio access technologies (RATs) which are supported and have been activated or deactivated by the one or more neighbor BSs from a control station; transmitting an activation request message from the serving BS to the control station in order to activate the radio access technology in the deactivated state if there is a need for activating the deactivated RAT to connect the terminal to the one or more neighbor BSs; receiving, by the serving BS and from the control station, an activation response message including information regarding the neighbor BSs and information regarding the at least one specific radio access technology which is activated according to the activation request message; and transmitting a connection request message from the serving BS to the terminal to allow the terminal to be connected to the one or more BSs according to the one or more activated radio access technologies using the at least one specific RAT.

7 Claims, 7 Drawing Sheets

METHOD FOR CONTROLLING CONNECTION CONFIGURATION BY FEMTO BASE STATION AND METHOD FOR CONFIGURING CONNECTION BY TERMINAL

CROSS REFERENCE TO RELATED APPLICATIONS

This application is the National Phase of PCT/KR2010/006595 filed on Sep. 28, 2010, which claims priority under 35 U.S.C. 119(e) to U.S. Provisional Application No. 61/321,835 filed on Apr. 7, 2010 and under 35 U.S.C. 119(a) to Patent Application No. 10-2010-0048761 filed in Republic of Korea on May 25, 2010, all of which are hereby expressly incorporated by reference into the present application.

TECHNICAL FIELD

The present invention relates to a mobile communication system and, more particularly, to a femto base station in a mobile communication system.

BACKGROUND ART $2^{nd}$ mobile communication refers to transmission and reception of voice through mobile communication, which includes CMDA, GSM, and the like. GPRS, advancing from the GSM, has been proposed to provide a packet switched data service based on the GSM system.

$3^{rd}$ generation mobile communication allows for transmission and reception of image and data, as well as voice, and 3GPP (Third Generation Partnership Project) has developed a mobile communication system (IMT-2000) technique and adopts WCDMA as a radio access technology (RAT). The combination of the IMT-2000 technique and the radio access technology (RAT), e.g., WCDMA, is called a UMTS (Universal Mobile Telecommunication System). UTRAN is an acronym of UMTS Terrestrial Radio Access Network.

$3^{rd}$ generation mobile communication is evolving to 4th mobile communication.

The 4th mobile communication technique includes a long-term evolution network (LTE) technique under standardization by 3GPP and an IEEE 802.16 technique under standardization by IEEE. The LTE uses a term of E-UTRAN (Evolved-UTRAN).

The 4th mobile communication technique has introduced OFDM (Orthogonal Frequency Division Multiplexing)/OFDMA (Orthogonal Frequency Division Multiple Access). OFDM uses a plurality of orthogonal subcarriers. OFDM uses orthogonality between IFFT (Inverse Fast Fourier Transform0 and FFT (Fast Fourier Transform). A transmitter performs IFFT on data and then transmits the same. A receiver performs FFT on received signal to restore the original data. The transmitter uses IFFT in order to combine a plurality of subcarriers and the receiver uses corresponding FFT in order to split the multiple subcarriers.

Meanwhile, in the 3rd and 4th mobile communication system, attempts for increasing cell capacity continue to support high capacity services such as multimedia contents, streaming, and the like, and bi-directional services.

In order to increase cell capacity, there has been an approach of using a high frequency band and reducing a cell radius. The use of a cell, such as a pico cell, or the like, having a small cell radius allows for the use of a higher frequency band than that used for the existing cellular system, having the advantages that more information can be delivered. However, because a larger number of base stations must be necessarily installed in the same area, much cost incurs.

Thus, recently, a femto cell has been proposed as one of approaches of increasing cell capacity by using small cells.

Femto cell refers to provision of a small-scale radio environment by installing a base station using small power in indoor spaces such as homes, offices, and the like. The femto cell is expected to improve an indoor service available area and increase capacity to thus enhance quality of service (QoS), and also expected to completely settle the next generation mobile communication system by providing data services.

For such a femto cell, standardization is ongoing in the name of Home eNodeB by 3GPP WCDMA and LTE group, and 3GPP2 is also actively studying femto cell.

Figure 1:
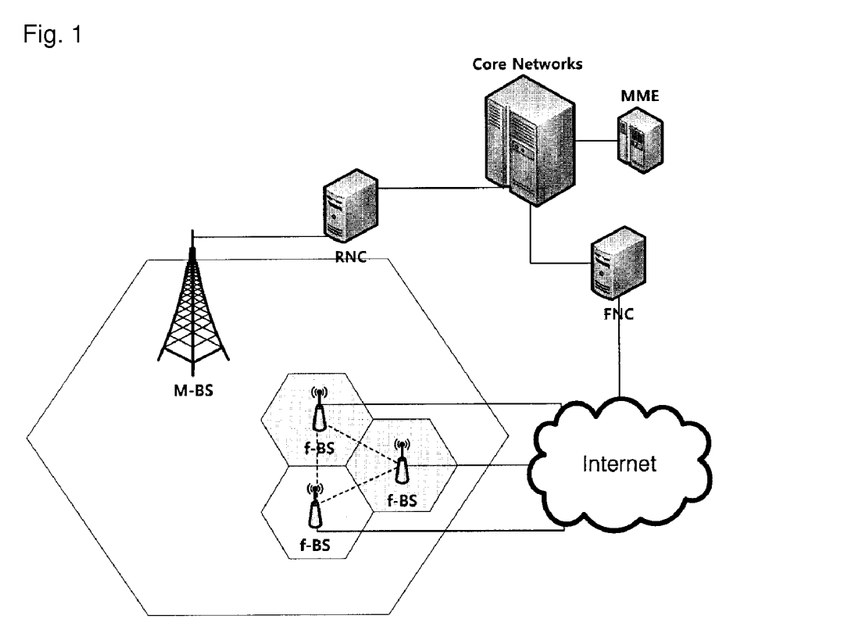
FIG. 1 is a view illustrating an example of a femto cell-based network architecture according to the related art.
Figure 2:
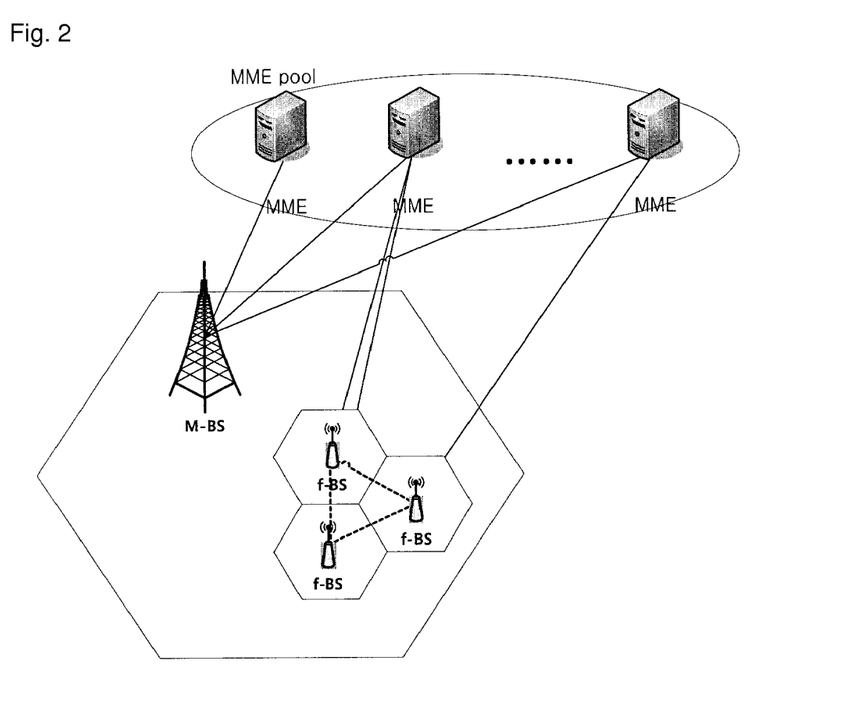
FIG. 2 is a view illustrating another example of a femto cell-based network architecture according to the related art.

Various structures as illustrated in FIGS. 1 and 2 have been proposed in order to implement such a femto cell in the existing mobile communication network.

First, FIG. 1 illustrates an example of a network structure based on femto cells according to the related art.

As shown in FIG. 1, a macro base station (M-BS) serving a wider area and a plurality of femto base stations (f-BSs) installed based on users.

The f-BSs are connected with a femto cell network controller (FNC) through the Internet so as to be under the control of the FNC, and provide services to users.

A terminal measures signals of neighboring cells and delivers the measured signal values to its f-BS, and the f-BS recognizes and administers the presence of neighboring cells based on the received signal values. Also, the f-BSs exchange information through a direct link or an indirect link through the FNC. The f-BSs and the M-BS transmit and receive information through the FNC, an RNC (Radio Network Controller) or through an MME (Mobility Management Entity) that controls the f-BSs in a mobile communication network.

FIG. 2 illustrates another example of a femto cell-based network structure according to the related art.

As shown in FIG. 2, f-BSs exchange information through a direct link or an MME, unlike the case illustrated in FIG. 1. Also, the M-BS and the f-BSs exchange through MMEs.

Meanwhile, recently, a service called FMC (Fixed Mobile Convergence) has been introduced. The FMC technique provides a cellular-based radio access technology (RAT), for example, a CDMA, TDMA, IMT-2000 (e.g., CDMA2000, W-CDMA), and LTE-based access scheme and a unlicensed frequency-based radio access technology (RAT) (e.g., Unlicensed Mobile Access, Bluetooth or Wi-Fi) to a terminal. To this end, the terminal must support a dual-mode.

Thus, when the dual-mode terminal comes close to a unlicensed frequency-based radio base station, the dual-mode terminal is allowed to use the same service as that in a cellular-based RAT through the unlicensed frequency-based RAT. For example, when the dual-mode terminal enters an area of a small radio base station using the unlicensed frequency-based RAT while it is communicating with the cellular mobile communication base station (i.e., the M-BS), it performs handover according to the unlicensed frequency-based RAT of the small radio base station to continue communication of high band seamlessly. In other words, as a terminal performs seamless handover between base stations, the dual-mode terminal is able to perform seamless handover between the cellular-based RAT and the unlicensed frequency-based RAT.

There have been attempts of applying such an FMC technique to a femto base station. Namely, among them is an attempt of combining the FMC communication technique along with cellular mobile communication to the femto base station.

Figure 3:
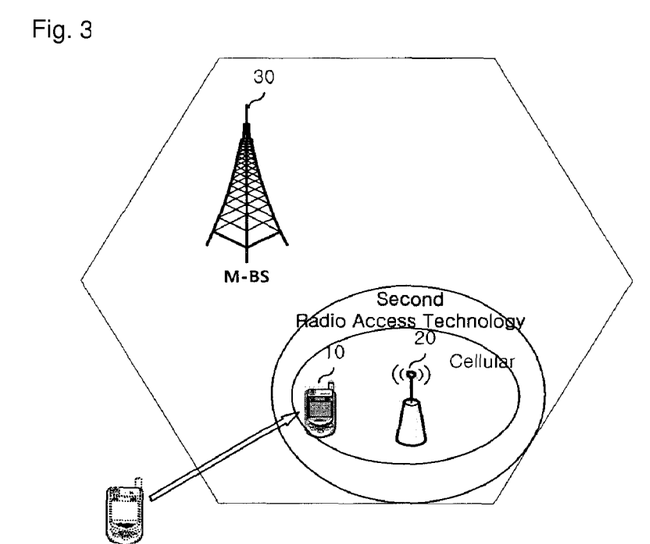
FIG. 3 is a view illustrating the combination of a femto base station and an FMC (Fixed Mobile Convergence) technique.

FIG. 3 illustrates an example of combining the femto base station and the FMC technique.

As shown in FIG. 3, an M-BS 30 and an f-BS 20 are illustrated. The M-BS 30 is a general BS, but in this case, because the size of its cell radius is larger than the f-BS, the general BS is called the M-BS.

The f-BS 20 provides both a first RAT such as cellular communication and a second RAT based on an unlicensed frequency. Thus, when the terminal is located within the coverage of the f-BS 20, the terminal can be provided with a service through the unlicensed frequency-based RAT.

However, the related art does not provide a substantial procedure as to which of the first RAT such as the cellular communication or the second RAT such as unlicensed frequency based RAT provided by the target f-BS 20 the terminal 20 is to select when the terminal 10 enters the coverage of the target f-BS 20.

Thus, the related art terminal 10 preferentially selects the first RAT such as cellular communication provided by the target f-BS 20 for its accessing, which results in a failure of utilization of the FMC technique.

Also, if a femto BS supports multiple RATs, the femto BS could deactivate a specific RAT which is not used among the multiple RATs. In such situation, the terminal could not use the specific RAT to connect to the femto BS since the technique to allow the terminal to use the deactivated RAT is not provided.

DISCLOSURE OF INVENTION

Solution to Problem

The present invention has been made in view of the above-mentioned problem, and it is one object of the invention to allow a terminal to communicate with a target femto base station (FBS) by using the most suitable radio access technology (RAT) when the terminal newly accesses the target FBS or performs handover.

To achieve the above object, the present invention proposes a method for allowing a terminal for selecting an optimal radio access technology (RAT) over a serving FBS with which the terminal is communicating after accessing or a neighbor FBS which the terminal has not accessed yet but can communicate therewith, according to a current status of the terminal and the FBS.

To achieve the above object, there is also provided a method for allowing a terminal to use both a radio access technology (RAT) of a currently connected first FBS and a radio access technology (RAT) of a neighbor FBS when the terminal moves to an area where the coverage of the FBSs overlaps.

To achieve the above object, there is also provided a method for controlling connections between a terminal and one or more neighbor base station (BSs) by a serving BS with respect to the terminal. The method for controlling a configuration of the connections between a terminal and one or more neighbor BSs includes: receiving, by the serving BS and from a control station, information regarding radio access technologies (RATs) which are supported and have been activated or deactivated by the one or more neighbor BSs from a control station; transmitting an activation request message from the serving BS to the control station in order to activate at least one specific RAT in the deactivated state if there is a need for activating the deactivated RAT to connect the terminal to the one or more neighbor BSs; receiving, by the serving BS and from the control station, an activation response message including information regarding the neighbor BSs and information regarding the at least one specific RAT which is activated according to the activation request message; and transmitting a connection request message from the serving BS to the terminal to allow the terminal to be connected to the one or more BSs using the at least one specific RAT.

The method may further include: receiving, by the serving base station, a measurement report message with respect to one or more neighbor BSs from the terminal; and transmitting, by the serving BS, a report message with respect to the one or more neighbor BSs to the control station based on the measurement report message.

The method may further include: determining the at least one specific RAT required for connecting the terminal and the one or more neighbor BSs.

The step of the determining the at least one specific RAT may comprises determining whether to additionally establish a new session between the neighbor BSs and the terminal while the session which has been established between the serving base station and the terminal is maintained or whether to transfer a session which had been established between the serving base station and the terminal to the neighbor BSs.

The method may further include: transmitting a connection request message including information regarding one or mores RAT which are to be used for a connection with the neighbor BSs to the terminal; and receiving a connection response message including information regarding at least one specific RAT requested by the terminal.

The method may further include: exchanging, by the serving BS, at least one of information on at least one RAT supportable by the serving BS or by the terminal and information on at least one RAT preferred by the serving BS or by the terminal.

To achieve the above object, there is also provided a method for establishing a connection, including: receiving, by a terminal and from a serving BS, information regarding one or more neighbor base stations (BSs) and information regarding RATs which are supported and have been activated or deactivated by the one or more neighbor BSs; transmitting information regarding an RAT requested to be activated among the deactivated RATs; receiving, by the terminal and from the neighbor BSs, system information with respect to the RAT which is activated according to the transmission; and connecting the terminal to the neighbor BSs by using the system information.

The method may further include: receiving a reference signal from the one or more neighbor base stations (BSs); and receiving system information including information regarding the one or more RATs which have been activated or deactivated by the one or more neighbor BSs from the neighbor BSs, wherein the system information is received through the RAT in a deactivated state.

The method may further include: determining whether or not configuration of a connection to the one or more neighbor BSs is required after the information is received; and determining an RAT to be used for a connection to the one or more neighbor BSs if the configuration of a connection to the one or more neighbor BSs is required.

The method may further include: receiving a reference signal from the one or more neighbor BSs through the activated RAT; performing a cell measurement by using the reference signal; and determining whether to connect the terminal to the neighbor BSs according to the measurement results.

The method may further include: transmitting a result report on the connection to the serving BS after the connection is made.

To achieve the above object, there is also provided a method for configuring a connection, including: receiving, by a terminal which has accessed a serving femto base station (BS), system information including information regarding one or more RATs which are supported and have been activated or deactivated by one or more neighbor femto BSs from the one or more neighbor femto BSs, the system information being received through an RAT in an activated state; transmitting, by the terminal, a connection request message including information regarding the RAT in the activated state to the one or more neighbor femto BSs if it is needed to connect to the one or more neighbor femto BSs through at least one RAT in a deactivated state, the connection request message being transmitted by using the RAT in the activated state; and accessing the neighbor femto BSs by using an RAT activated according to the request.

The method may further include: determining whether of a connection to the one or more neighbor BSs is required; and determining an RAT to be used for a connection to the one or more neighbor BSs if when the connection is required.

The method may further include: receiving a reference signal from the one or more neighbor BSs through the RAT activated according to the request; performing a cell measurement by using the reference signal; and determining whether to connect the terminal to the neighbor BSs according to the measurement results.

The method may further include: transmitting a result report on the connection to the serving BS after the connection is set.

To achieve the above object, there is also provided a method for establishing a connection with a femto base station. the method comprises performing, by a terminal, a capability negotiation procedure. During the capability negotiation procedure, information on one or more RATs, which are supported and had been activated by at least one of the terminal and the femto base station, and information on at least one or more RATs, which are preferred by at least one of the terminal and the femto base station, are exchanged between the terminal and the femto base station (BS). Also, the method may further comprise establishing, by the terminal, a first connection with the femto base station (BS) using a first RAT which has been activated based on the information; transmitting, by the terminal, a message for activating a specific RAT among the one or more deactivated RATs to the femto base station; establishing, by the terminal, a second connection with the femto base station (BS) using the specific RAT which has been activated according to the transmission of the message.

The message for activating the specific RAT may be a connect request message including information on the specific RAT to be activated. Also, the method may further comprise receiving a connect response message including information on the specific RAT which has been activated according to the transmission of the connect request message.

The method may further comprises receiving, from the femto base station, a connect request message including information on the specific RAT. Here, the message for activating the specific RAT may be a connect request response message.

According to the exemplary embodiments of the present invention, a particular terminal can selectively use an advantageous RAT according to the characteristics of a service the particular terminal currently uses.

Also, according to the exemplary embodiments of the present invention, if a femto BS had been deactivate a specific RAT, the terminal can request thee femto BS to activate the specific RAT and then connect to the femto BS using the specific RAT.

Furthermore, traffic of terminals that may be concentrated into a single base station can be distributed. In addition, excessive power consumption that may be otherwise generated when a base station simultaneously uses a plurality of communication schemes. Moreover, because the terminal can simultaneously access a plurality of base stations through different RATs, the bandwidth can be increased.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

The present invention is applied to a femto base station (BS). However, without being limited thereto, the present invention can be also applicable to any communication system and method to which a technical idea of the present invention is applicable.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention. The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The terms used in the following description of the present invention will now be explained before describing the exemplary embodiments of the present invention.

In the following description, a terminal is used, but the terminal may be also referred to as a term such as user equipment (UE), mobile equipment (ME), mobile station (MS), or the like. Also, the UE may be a portable device such as a notebook computer, a mobile phone, a PDA, a smartphone, a notebook computer, and the like, or a non-portable device such as a PC or a vehicle-mounted device.

In the following description, a term called femto base station is used, which may be also called a home (e)NodeB.

In this document, it is assumed that both a mobile terminal and a femto cell base station are all available for communication by using a plurality of radio access technologies (RATs). Namely, a first RAT such as 3GPP LTE, IEEE 802.16m, and the like, and a second ratio access technology (RAT) such as a wireless local area network (WLAN), Bluetooth™, ZigBee™, and the like, can be simultaneously used at a particular time point.

Also, in this document, an area in which communication areas of two adjacent base stations overlap is defined as a 'overlapped region', a mobile terminal located in the overlapped region can simultaneously communicate with a plurality of base stations by using a plurality of communication schemes.

The concept of the present invention will now be described briefly before explaining methods proposed by the present invention.

First, according to an exemplary embodiment of the present invention, a terminal is allowed to communicate with a neighbor femto base station (FBS) by using a second RAT, while communicating with a first FBS (i.e., a serving FBS) by using a first RAT, thus distributing traffic of the terminal into the two BSs. In this case, the terminal may selectively use an RAT having the best access quality according to a channel state among the RATs provided by the respective BSs.

Namely, when the terminal is located in the overlapped region of the first and second BSs, the terminal may measure each channel quality with respect to the RATs provided by the first and second BSs and access through an RAT having good channel quality to each base station according to each channel quality. For example, when access quality of a cellular-based RAT with respect to the first BS is good and access quality of a second RAT with respect to the second BS is good, the terminal communicates with the first BS by using the first RAT and communicates with the second BS by using the second RAT, thus improving communication quality and the bandwidth of the terminal.

Meanwhile, according to an exemplary embodiment of the present invention, when the terminal 100 accesses the neighbor second femto BS, a scheme in which the first femto BS determines whether to generate a new RAT different from the RAT based on which the terminal is connected to the first femto BS and a scheme in which the terminal determines it by itself are provided.

Also, according to an exemplary embodiment of the present invention, when the terminal performs handover from the first BS to the neighbor second BS, the terminal may be allowed to use the second RAT, Meanwhile, the BSs provide a plurality of RATs, but when a particular RAT is not in use, the BSs deactivate the particular RAT. In this case, the deactivation refers to not performing an operation wirelessly for the corresponding RAT.

Meanwhile, when the terminal attempts to access the second BS, if the particular RAT has been deactivated, the terminal can activate the deactivated RAT of the second BS according to the method of an exemplary embodiment of the present invention.

This will now be described in detail with reference to the accompanying drawings.

Figure 4:
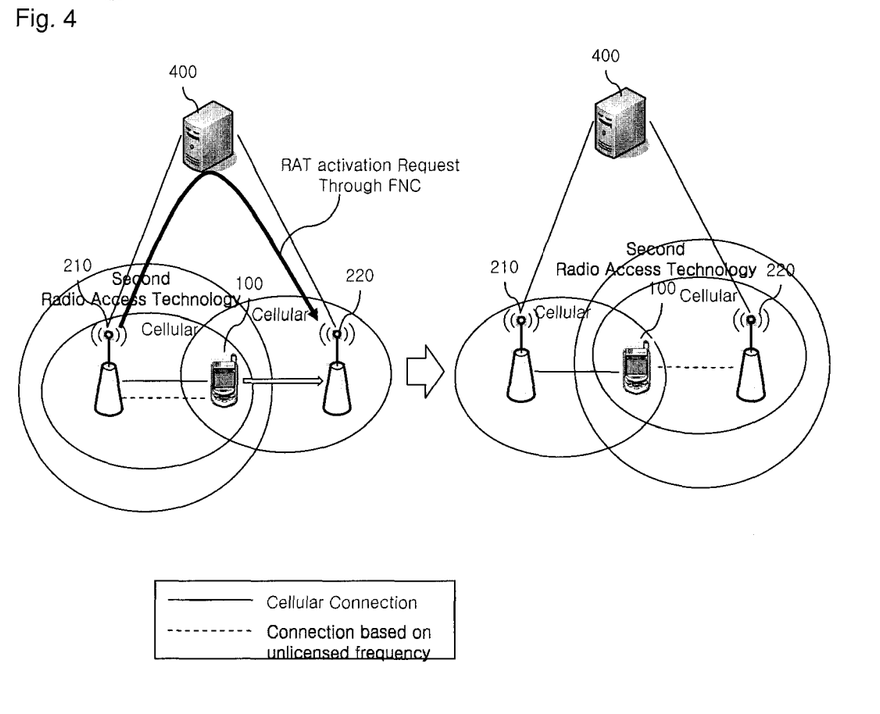
FIG. 4 is a conceptual view illustrating a method according to a first exemplary embodiment of the present invention.

FIG. 4 is a conceptual view illustrating a method according to a first exemplary embodiment of the present invention.

With reference to FIG. 4, a terminal 100, a first femto BS 210, a second femto BS 220, and a femto cell network controller (FNC) 400 are illustrated.

The first or second femto BS 210 or 220 provides a cellular-based first RAT and a unlicensed frequency-based second RAT (e.g., UMA, WLAN, Bluetooth™, Zigbee, White Space Communication and the like).

In this case, as illustrated, a cell coverage of the cellular-based RAT may be smaller than that of the unlicensed frequency-based second RAT. This is because a transmission coverage are various according to a characteristic of each RAT.

Also, when the first or second femto BS 210 or 220 simultaneously provides the cellular-based first RAT and the unlicensed frequency-based second RAT, much power is consumed, so the first or second femto BS 2000 may appropriately deactivate a currently unused RAT among multiple RATs.

FIG. 4 illustrates that the second femto BS 220 activates only the cellular-based first RAT and deactivates the unlicensed frequency-based second RAT.

Also, in FIG. 4, it is illustrated that the terminal 100 is provided with a service through the cellular-based RAT and the unlicensed frequency-based RAT from the first BS 210.

In this case, the terminal moves to a overlapped region in which the cell coverage of the first femto BS 210 and the second femto BS 220 overlaps. Then, the terminal 100 transmits a request for activating the second RAT of the second femto BS 220 to the femto cell network controller (FNC) 400 through the first femto BS 210 or the first femto BS 210 transmits a request for activating the second RAT to the FNC.

The FNC 400 delivers the activation request to the second femto BS 220. When the second femto BS 220 activates the second RAT, the terminal 100 transfers the session which has been connected with the first femto BS 210 according to the second RAT to the second femto BS 220.

Accordingly, the terminal 100 may perform a service according to the first RAT with the first femto BS 210, and perform a service according to the second RAT with the second femto BS 220.

Namely, the first femto BS 210 and the second femto BS 220 can cooperatively provide a service to the terminal.

Through such an operation, the first femto BS 210 can distribute traffic to the second femto BS 220.

Meanwhile, when there is no more terminal to which the first femto BS 220 has provided a service through the second RAT, the first femto BS 220 may deactivate the first RAT.

Likewise, the second femto BS 220 may activate only the second wireless access scheme, and then when there is no terminal connected by using the first RAT, the second femto BS 220 may deactivate the first RAT.

Figure 5:
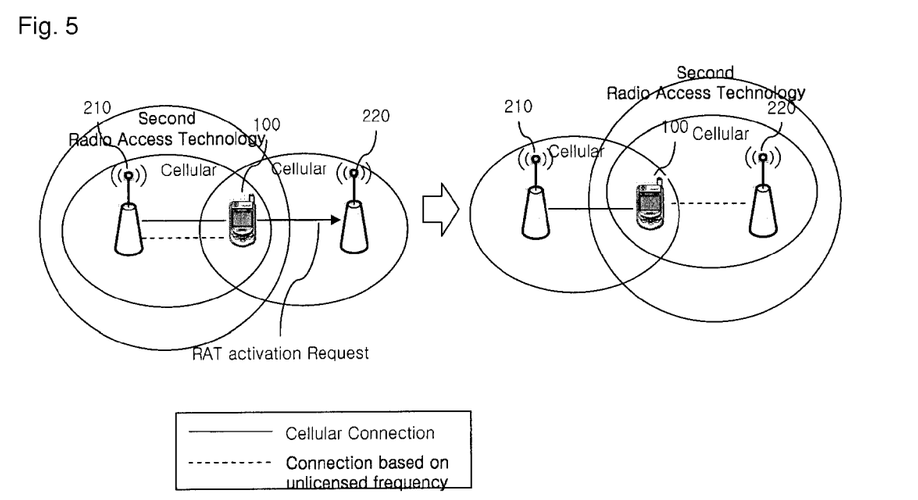
FIG. 5 is a conceptual view illustrating a method according to a second exemplary embodiment of the present invention.

FIG. 5 is a conceptual view illustrating a method according to a second exemplary embodiment of the present invention.

With reference to FIG. 5, the terminal 100, the first femto BS 210, and the second femto BS 220 are illustrated.

Unlike the first exemplary embodiment illustrated in FIG. 4, in the second exemplary embodiment illustrated in FIG. 2, the terminal 100 transmits a request for activating the second RAT of the second femto BS 220 to the second femto BS 220.

In this case, the terminal 100 directly transmits the activation request by using the activated RAT.

The second exemplary embodiment of the present invention in which the terminal 100 transmits the activation request to the neighbor second femto BS 220, namely, to the target femto BS is effective when the second femto BS 220 is not connected with the FNC and the respective femto BSs are disposed in such a distributed manner that they perform a control function by themselves. Also, the second exemplary embodiment is advantageous in that, because the terminal 100 activates the RAT of the neighbor second femto BS according to the determination of the terminal 100 itself and does not pass through the FNC, a new connection can be quickly established.

Thus, the terminal 100 may perform a service with the first femto BS 210 according to the first RAT, and performs a service with the second femto BS 220 according to the second RAT.

Namely, the first femto BS 210 and the second femto BS 220 may cooperatively provide a service for the terminal 100.

Figure 6:
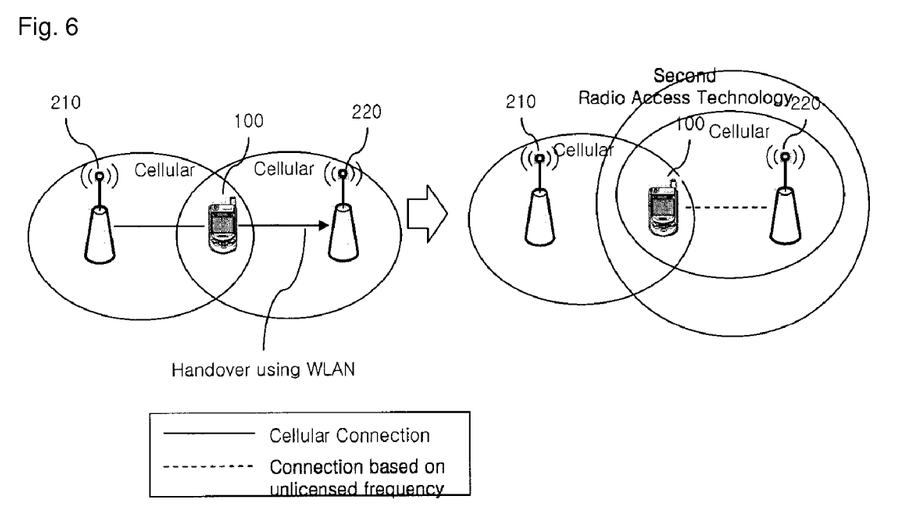
FIG. 6 is a conceptual view illustrating a method according to a third exemplary embodiment of the present invention.

FIG. 6 is a conceptual view illustrating a method according to a third exemplary embodiment of the present invention.

Unlike the first exemplary embodiment of the present invention illustrated in FIG. 4 and the second exemplary embodiment of the present invention illustrated in FIG. 5, in the third exemplary embodiment of the present invention illustrated in FIG. 6, the terminal 100 transfers a session ongoing through the first RAT with the first femto BS 210 to the second femto BS 220. In this case, as the session is transferred to the second femto BS 220, it is configured by using the second RAT.

Namely, unlike the first and second exemplary embodiments of the present invention in which the first femto BS 210 and the second femto BS 220 cooperatively provide a service, in the third exemplary embodiment of the present invention, the ongoing session is transferred to the second femto BS 220.

In this case, when the second RAT of the second femto BS 220 has been deactivated, the terminal 100 transmits a request message for activating the second RAT of the second femto BS 220 to the second femto BS 220. The request message may be transmitted through the first femto BS 210 to the second femto BS 220.

In this case, the activation request may include handover-related information (e.g., information indicating that handover is requested, and information required for handover). In detail, the handover-related information may include a time (rendezvous time) at which the terminal is to access the second femto BS, information on security, Service QoS, user priority level information, and the like.

According to the third exemplary embodiment of the present invention, because the terminal activates the second RAT of the second femto BS and, at the same time, transmits a handover request, whereby the terminal can quickly transfer the ongoing session.

Figure 7:
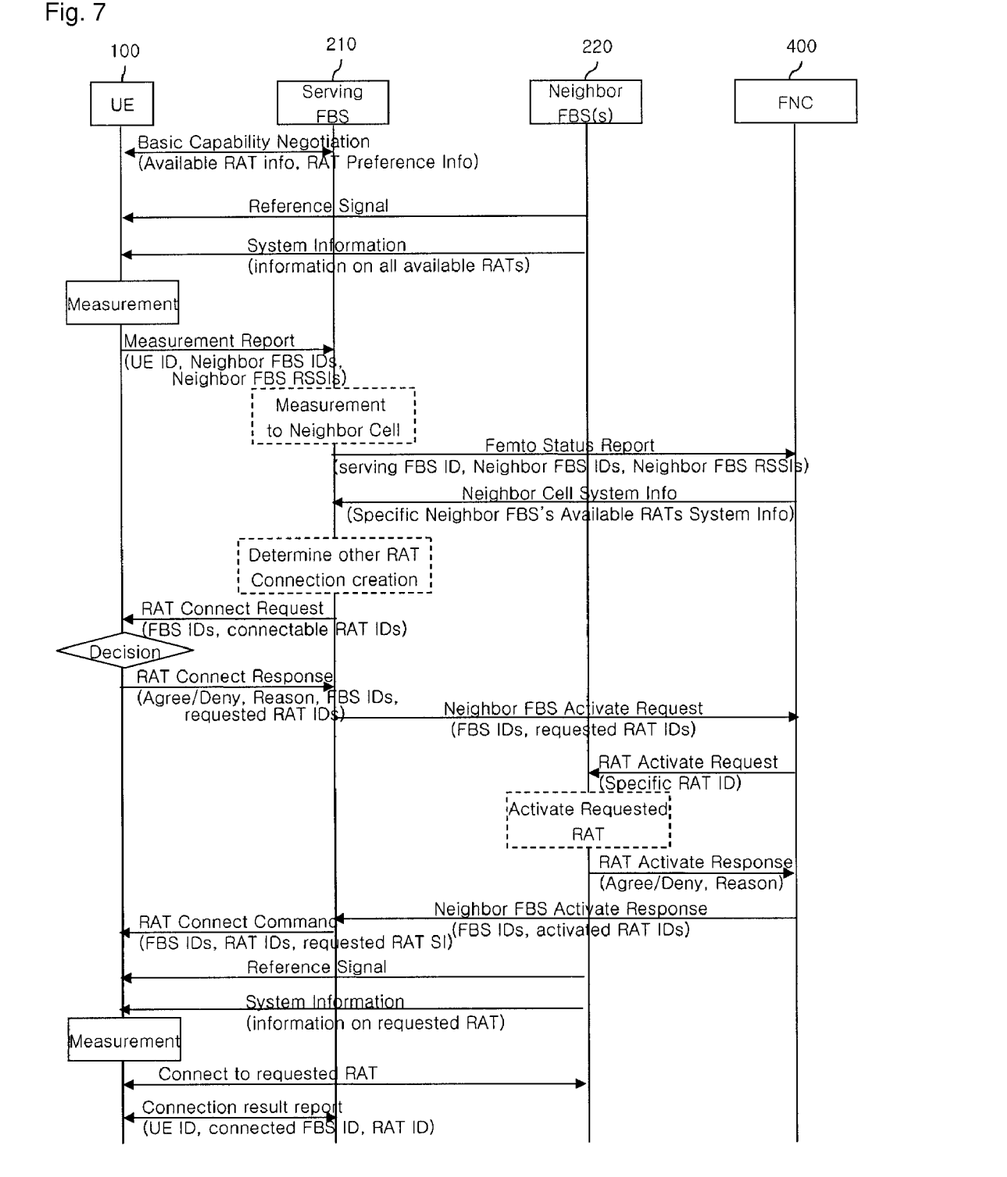
FIG. 7 is a flow chart illustrating the process of the method of FIG. 4 according to the first exemplary embodiment of the present invention.

FIG. 7 is a flow chart illustrating the process of the method of FIG. 4 according to the first exemplary embodiment of the present invention.

As shown in FIG. 7, when the terminal 100 accesses the neighbor second femto BS, the first femto BS determines whether or not a new RAT different from an RAT according to which the terminal 100 is connected with the first femto BS is to be generated.

In this manner, according to the method illustrated in FIG. 7, even when the terminal 100 cannot directly communicate with the neighbor second femto BS because the neighbor second femto BS 220 deactivates all the RATs so none of the RATs are currently operated, a particular RAT of the second femto BS can be activated through the FNC, to which the terminal 100 can be connected.

Namely, when the neighbor second femto BS 220, to which the terminal 100 wants to be connected, has deactivated all the RATs so there is no RAT being currently operated, the terminal 100 cannot communicate with the neighbor second femto BS 220, and thus, it cannot request a connection with respect to a particular RAT from the second femto BS 220.

However, because the FNC 400 holds information regarding available RATs of the second femto BS 220, the terminal 100 can request the FNC 400 to activate a particular RAT of the second femto BS 220 through the first femto BS 210.

This will be described in detail as follows.

1) The terminal 100 performs a basic capability negotiation with the first femto BS 210, e.g., the illustrated serving femto BS. Namely, the terminal 100 transmits information regarding supported RATs (available RAT Info) and information regarding a preferred RAT (RAT preference Info) to the first femto BS 210. Also, the first femto BS 210 transmits information regarding supported RATs (available RAT Info) and information regarding a preferred RAT (RAT preference Info) to the terminal 100. The information regarding supported RATs (available RAT Info) may include IDs of RATs. The information regarding the preferred RATs (RAT preference Info) may be expressed in the ascending order or descending order according to priority levels of the preferred RATs. In this case, the different types of RATs may be represented by different IDs.

The basic capability negotiation may be performed when the terminal 100 initially accesses the first femto BS or when the capability (for example, a preferred RAT) of the terminal 100 or the first femto BS 210 is changed.

2) Meanwhile, the neighbor second femto BS 220 transmits a reference signal by using an RAT which is currently activated and operated. Also, the second femto BS 220 transmits system information. The system information transmitted by the second femto BS 220 includes information regarding at least one or more RAT supported by the second femto BS. The RAT which has been activated to be currently operated may be WCDMA. LTE, or IEEE 802.16. Thus, the system information may be a beacon message based on IEEE 802.16. Or, the system information may be transmitted on a primary common control physical channel (PCCPCH). The supportable RAT included in the system information includes information regarding every available RAT as well as the RAT which has been activated to be currently operated. Thus, the terminal 100 can know about all sorts of RATs supported by the second femto BS through the system information.

3) Then, the terminal 100 performs a cell detection with respect to the second femto BS based on the received reference signal and measures channel quality.

And, the terminal 100 transmits a measurement report message including the measurement results to the serving femto BS, namely, the first femto BS, to which the terminal 100 is currently connected. The measurement report message may include a UE ID indicating the ID of the terminal 100, a neighbor FBS ID indicating the ID of the detected neighbor femto BS, and a neighbor FBS RSSI indicating a signal strength of the second femto BS. Also, the measurement report message may include information regarding an RAT supported by the second femto BS.

4) When the first femto BS 210 has a function of searching a neighbor BS, the first femto BS 210 searches a neighbor BS and stores its search results in addition to the measurement report message which has been received from the terminal 100.

The first femto BS 210 transmits a femto status report message to the FNC 400. The femto status report message may be generated based on the measurement may be generated based on the measurement report message received from the terminal 100 and the search results of the first femto BS 210. The femto status report message may include the ID (UE ID) of the terminal, the ID of the serving femto BS (Serving FBS ID), the ID of the neighbor femto BS (neighbor FBS ID), a signal strength value of the neighbor femto BS (neighbor FBS RSSI) and information on at least one or more RATs supportable by the neighbor femto BS.

When the FNC 400 receives the femto status report message, it checks neighbor femto BSs adjacent to the serving femto BS of the terminal 100 based on the femto status report message, and when the terminal 100 requests a new connection, the FNC 400 recognizes an accessible femto BS. In this case, the FNC 400 may recognize a femto BS the terminal can access, by using previously recognized location information of femto BSs.

The FNC 400 transmits a neighbor cell system information message, e.g., Neighbor Cell System Info message, including information regarding the recognized femto BSs, to the first femto BS. The neighbor cell system information message, e.g., the Neighbor Cell System Info message, includes information IDs of the accessible femto BSs and information regarding available RATs of the corresponding femto BSs.

5) Then, the first femto BS 210 determines whether or not the terminal 100 should establish a connection with the second femto BS. Also, the first femto BS 210 determines whether or not a connection should be established with the neighbor second femto BS according to an RAT different from the connected RAT.

In detail, when the first femto BS 210 receives a neighbor cell system information message from the FNC 400, it determines one or more neighbor femto BSs most suitable for the terminal 100 based on the received neighbor cell system information message and determines one or more RATs to be used for a connection with the determined neighbor femto BSs.

And, the first femto BS 210 transmits a connection request message requesting the terminal 100 to be connected with the determined femto BSs according to the determined RAT, to the terminal 100. In this case, the connection request message includes the results of the determination. In detail, the connection request message includes IDs of one or more femto BSs determined by the first femto BS and the IDs regarding the one or more determined RATs.

6) When the terminal 100 receives the connection request message, it determines whether to generate a new connection with the one or more femto BSs. In this case, the terminal 100 may determine which of the femto BSs it is to be connected according to which of the RATs.

The terminal 100 transmits a connection response message including the results of the determination to the first femto BS. The results of the determination included in the connection response message includes information indicating whether the terminal agrees with the new connection or whether the terminal denies the new connection, information indicating the corresponding reason, IDs of one or more femto BSs desired to be connected, and IDs of the one or more RATs according to which the terminal is to be connected with the femto BSs desired to be connected. The reason information indicates whether or not the terminal wants to establish a new connection with the second femto BS 220 while maintaining the connection with the first femto BS or whether or not the terminal wants to perform handover to transfer the connection with the first femto BS to the second femto BS 220. When the reason information indicates handover, the connection response message may further include handover-related information. The handover-related information may include a time (rendezvous time) at which the terminal is to be connected to the second femto BS, security, QoS, user priority level information, and the like.

Meanwhile, there may be a plurality of femto BSs to which the terminal 100 wants to be connected or there may be a plurality of RATs according to which the terminal 100 is to be connected. In this case, the terminal 100 may activate the RATs of the neighbor femto BSs, measure channel quality, and select a neighbor femto BS having the best quality and an RAT having the best quality.

7) When the first femto BS 210 receives the connection response message, it may refer to the results of the determination by the terminal within the connection response message, and check whether or not an RAT according to which the terminal wants to be connected has been deactivated by the corresponding femto BS. When the RAT has been deactivated, the first femto BS 210 transmits a neighbor femto BS activation request message, e.g., a Neighbor FBS Activate Request message, to the FNC 400 in order to request for an activation of the RAT. The activation request message includes the ID of the corresponding femto BS and the ID of the RAT requested to be activated.

8) The FNC 400 transmits an activation request message, e.g., an RAT active request message' to the corresponding femto BS, e.g., the second femto BS 220, with reference to the ID of the femto BS included in the neighbor femto BS activation request message. The activation request message includes information regarding an RAT requested to be activated, namely, an ID.

9) When the second femto BS receives the activation request message, it determines whether to activate the corresponding RAT and performs activation. In this case, the activation refers to changing the corresponding RAT to a state in which the terminal can access by using a radio frequency. And then, the second femto BS 220 transmits an activation response message, e.g., an RAT Activate Response message, including the results of the determination, to the FNC 400. The activation response message includes the determination regarding the activation (i.e., whether the activation of the corresponding RAT is agreed or denied) and reason information.

10) When the FNC 400 receives the activation response message, e.g., the RAT Activate Response message, the FNC transmits a neighbor femto BS activation response message, e.g., a Neighbor FBS Activate Response message, to the first femto BS 210. The neighbor femto BS activation response message includes information (e.g., the ID) regarding the femto BS activated according to the response and information (e.g., the ID) regarding the RAT activated according to the request.

When the first femto BS 210 receives the neighbor femto BS activation response message, it transmits an access command message to the terminal. The access command message includes information (e.g., the IDs) regarding neighbor femto BSs, information regarding the activate RAT, and system information required for the terminal 100 to access the neighbor femto BS according to the corresponding RAT.

11) Meanwhile, the terminal 100 receives a reference signal and system information according to one or more activate RATs from the one or more neighbor femto BSs. Then, the terminal 100 performs measurement through the reference signal and determines an RAT and a femto BS each having the best channel quality.

The terminal 100 is connected to the corresponding femto BS, e.g., the second femto BS 22, according to the RAT having the best channel quality. And then, the terminal 100 transmits a connection result report message to the first femto BS 210. The connection result report message includes the ID of the terminal (UE ID), information regarding the accessed neighbor femto BS, and the information (RAT ID) regarding the RAT according to which the terminal is connected to the neighbor femto BS.

Meanwhile, although the plurality of femto BSs have activated the requested RATs according to the foregoing activation request, if the terminal 100 does not request a connection even after a certain time period lapses, the plurality of femto BSs may deactivate the activated RATs.

So far, the method in which when the terminal 100 accesses the neighbor second femto BS, the first femto BS determines whether or not it generates a new RAT different from the RAT according to which the terminal 100 is connected with the first femto BS has been described. Hereinafter, the method in which the terminal determines will be described.

Figure 8:
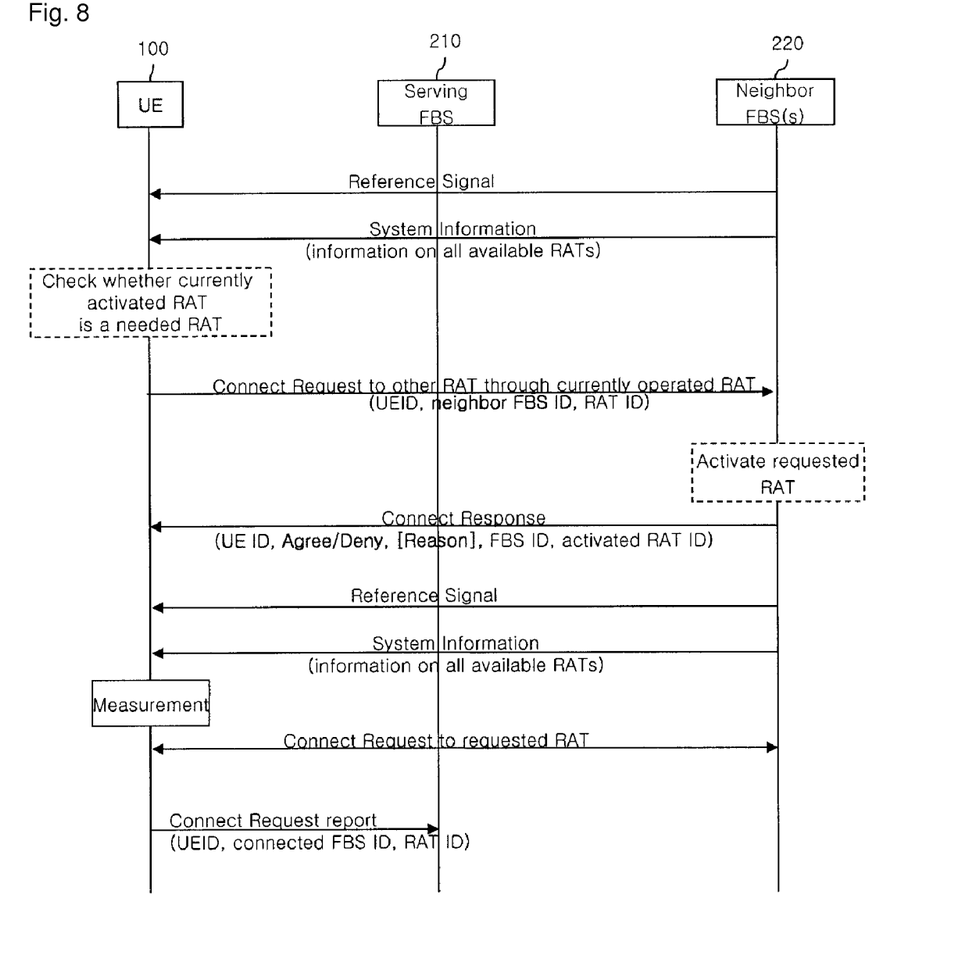
FIG. 8 is a flow chart illustrating the processes of the methods of FIGS. 5 and 6 according to the second and third exemplary embodiments of the present invention.

FIG. 8 is a flow chart illustrating the processes of the methods of FIGS. 5 and 6 according to the second and third exemplary embodiments of the present invention.

With reference to FIG. 8, the terminal 100, the first femto BS 210, the second femto BS 220 are illustrated. The terminal 100 is connected to the first femto BS 210 according to a first RAT.

1) The second femto BS adjacent to the first femto BS 210 periodically transmits a reference signal through an RAT which has been activated to be currently operated by the second femto BS. And, the second femto BS 220 periodically transmits system information including information regarding a supportable RAT.

2) Then, the terminal 100 performs a cell detection with respect to the second femto BS based on the received reference signal and measures channel quality. And then, the terminal 100 checks whether or not the RAT currently activated by the second femto BS 220 is an RAT required by the terminal 100. In other words, the terminal 100 checks RATs supported by the second femto BS based on the received system information, and determines whether or not the activated RAT is an access scheme required by the terminal 100 or whether or not there is an RAT required by the terminal 100 among the RATs supported by the second femto BS.

3) When one or more required by the terminal 100, among the RATs supported by the second femto BS, are not in an activated state, the terminal 100 transmits a connection request message with respect to the one or more requested RATs to the second femto BS 220. The connection request message may include the ID of the terminal (UE ID) and information regarding the one or more requested RATs (e.g., RAT ID). The connection request message may further include an identifier of the second femto BS. Also, the connection request message may further include information indicating whether or not the terminal wants to establish a new connection with the second femto BS 220, while maintaining the connection with the first femto BS, or whether or not the terminal wants to perform handover to transfer the connection with the first femto BS 210 to the second femto BS 220. The connection request message may further include handover-related information. The handover-related information may include a time (rendezvous time) at which the terminal is to be connected to the second femto BS, security, QoS, user priority level information, and the like.

4) Then, the second femto BS 220 activates one or more RATs according to the connection request. And, the second femto BS transmits a connection response message to the terminal 100. The connection response message may include an identifier of the terminal (e.g., UE ID), information indicating whether the connect request is agreed or denied. If the connect request is denied, the connection response message may further include information indicating a reason why the connect request is denied.

The connection response message includes the ID of the second femto BS and the information (e.g., RAT IDs) regarding the one or more activated RATs.

Meanwhile, the second femto BS 220 transmits a reference signal and system information through the activate RAT.

5) Then, the terminal 100 performs measurement through the reference signal and connected to the second femto BS 220 according to the RAT having the best channel quality among the one or more activated RATs.

The terminal 100 transmits a connection request report message to the first femto BS 210. The connection request report message includes the ID of the terminal (UE ID), the information regarding the accessed neighbor femto BS (connected FBS ID), and the information (RAT ID) regarding the radio access (RAT ID) according to which the terminal is connected to the second femto BS 220.

Figure 9:
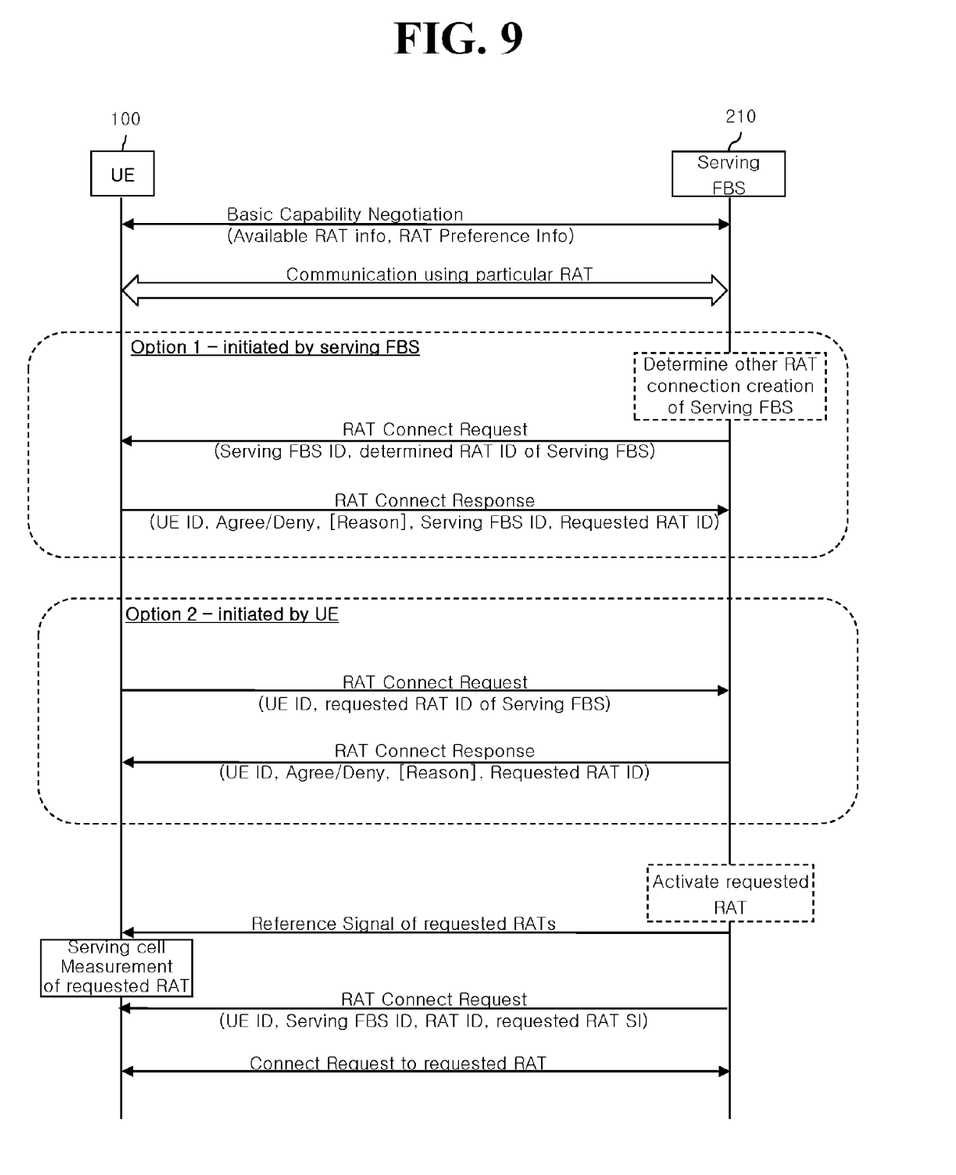
FIG. 9 is a flow chart illustrating the processes according to the fourth exemplary embodiments of the present invention.

FIG. 9 is a flow chart illustrating the processes according to the fourth exemplary embodiments of the present invention.

Referring FIG. 9, according to the fourth exemplary embodiments of the present invention, while the terminal 100 communicates with the serving femto BS 210 using a first RAT, the terminal 100 further uses a second RAT to communicate with the serving femto BS 210. This will be described in detail as follows.

1) First, the terminal 100 performs a basic negotiation with respect to capabilities. In more detail, the terminal 100 exchanges information on one or more supported RATs and information on at least one preferred RAT with the serving femto BS 210. Also, the serving femto BS 210 exchanges information on one or more supported RATs and information on at least one preferred RAT with the terminal 100. The information on the at least one preferred RAT may be so-called as RAT preference information and represent the preferred RAT in deceasing order or increasing order. In the RAT preference information, different types of RATs are discriminated by identifiers.

If the RAT preference info is changed, the basic negotiation may be further performed.

2) The terminal 100 and the serving femto BS 210 select a first RAT among the preferred RATs and communicates each other using the selected first RAT.

Thereafter, it is determined whether to use a second RAT for the communication between the serving femto BS 210 and the terminal 100.

In other words, while the terminal and the serving femto BS 210 use the first RAT to communicate each other, it is determined whether to use a second RAT different from the first RAT for the communication between the serving femto BS 210 and the terminal 100. The determination may be performed by the serving femto BS 210 or by the terminal 100.

3) First, the determination by the serving femto BS 210 is explained as below.

While the serving femto BS 210 uses the first RAT to communicate with the terminal 100, the serving femto BS 210 determines whether to uses a second RAT.

In order to request the terminal to use the second RAT for communication, the serving femto BS 210 transmits a connect request message, for example a RAT Connect Request message to the terminal 100. The connect request message includes at least one or more of an ID of the terminal (i.e., UE ID) and an ID of the serving femto BS. And, the connect request message may further include information on the second RAT (i.e., ID of the second RAT).

After receiving the connect request message, the terminal 100 determines whether to use the second RAT for the communication with the serving femto BS 210. Then, the terminal 100 transmits a response message, for example a RAT Connect Response message to the serving femto BS 210. The connect response message may include an ID of the terminal and an ID of the serving femto BS. Also, the connect response message further includes the result of the determination (for example, agree/deny). If the result of the determination indicates a refusal, deny, or reject, the connect response message may further include information on a reason of the refusal, deny, or reject. Also, the connect response message may further includes information on the serving femto BS (i.e., an ID) and information on the second RAT.

4) Meanwhile, the determination by the terminal 100 will be explained below.

While the terminal 100 uses the first RAT to communicate with the serving femto BS 210, the terminal 100 determines whether to uses a second RAT.

In order to request the serving femto BS 210 to use the second RAT for communication, the terminal 100 transmits a connect request message, for example a RAT Connect Request message to the serving femto BS 210. The connect request message includes at least one or more of an ID of the terminal (i.e., UE ID) and an ID of the serving femto BS. And, the connect request message may further include information on the second RAT (i.e., ID of the second RAT).

After receiving the connect request message, the serving femto BS 210 determines whether to use the second RAT. And then, the serving femto BS 210 transmits a connect response message, for example a RAT Connect Response message to the terminal 100.

5) If the second RAT is in a deactivated state, the serving femto BS 210 activate the second RAT.

And in order to instruct the terminal 100 to establish a connection with the serving femto BS 210 by using the second RAT, the serving femto BS 210 transmits a connect command message, for example RAT Connect Command message using the activated second RAT to the terminal 100. The connect command message includes at least one or more of an ID of the terminal and an ID of the serving femto BS, an ID of the second RAT, system information required for the terminal to set the connection with the serving femto BS 210.

Also, the serving femto BS 210 transmits a reference signal using the second RAT.

6) The terminal 100 receives the connect command message and then receives the reference signal based on the system information included in the connect command message. And the terminal 100 performs a channel measurement with respect to the serving femto BS using the received reference signal. If a value of the channel is higher than a predetermined threshold value, the terminal 100 tries to set a connection using the second RAT Meanwhile, the serving femto BS 210 may deactivate the second RAT, if the terminal does not set the connection using the second RAT, the terminal 100 refuses to use the second RAT, or the terminal 100 fails to use the second RAT.

The methods according to the present invention described thus far can be implemented as software, hardware or their combination. For example, the method according to the present invention may be stored in a storage medium (e.g., an internal memory, a flash memory, a hard disk, and the like), and may be implemented as codes or commands in a software program that can be executed by a processor (e.g., a microprocessor). This will now be described with reference to FIG. 10.

Figure 10:
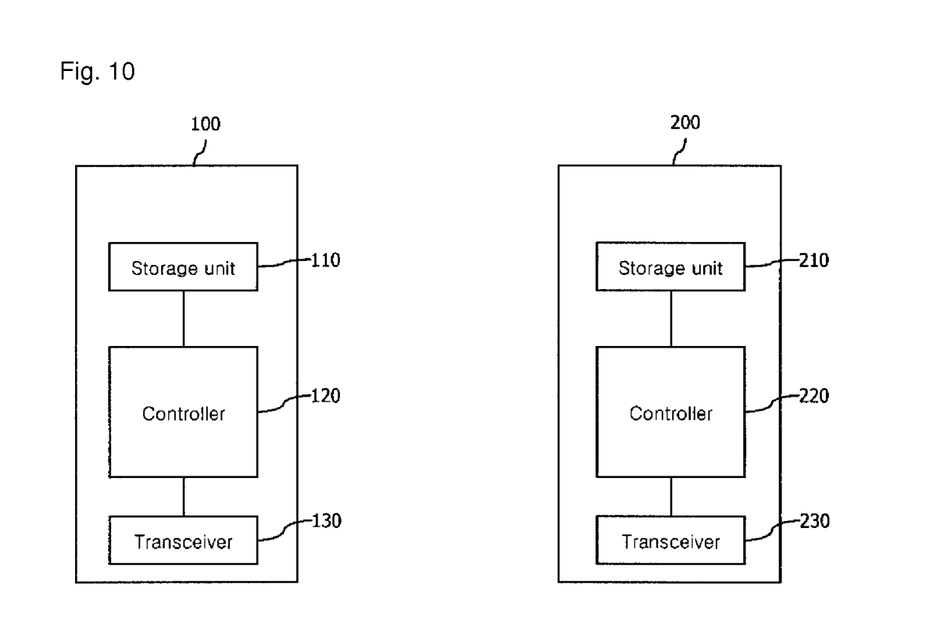
FIG. 10 is a schematic block diagram showing the configuration of a terminal 100 and a femto base station 200 according to an exemplary embodiment of the present invention.

FIG. 10 is a schematic block diagram showing the configuration of a terminal 100 and a femto base station 200 according to an exemplary embodiment of the present invention.

As shown in FIG. 10, the terminal 100 includes a storage unit 110, a controller 120, and a transceiver 130. The femto BS 200 includes a storage unit 210, a controller 220, and a transceiver 230.

The storage units 110 and 220 store the methods according to the first to fourth exemplary embodiments illustrated in FIGS. 4 to 9.

The controllers 120 and 220 control the storage units 110 and 210 and the transceivers 130 and 230. In detail, the controllers 110 and 220 execute the methods stored in the storage units 110 and 210. The controllers 120 and 220 transmit the foregoing signals through the transceivers 130 and 230.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for controlling connections between a terminal and one or more neighbor base station (BSs) by a serving BS with respect to the terminal, the method comprising:
   receiving, by the serving BS from a control station, information on a plurality of radio access technologies (RATs) which are supported and have been activated or deactivated by the one or more neighbor BSs;
   transmitting, by the serving BS to the control station, an activation request message to activate at least one specific RAT of the plurality of RATs which has been deactivated by the one or more neighbor BSs if the serving BS requires to activate the at least one specific RAT, thereby connecting the terminal to the one or more neighbor BSs;
   receiving, by the serving BS from the control station, an activation response message including information on the one or more neighbor BSs and information on the at least one specific RAT after being activated according to the activation request message; and
   transmitting, by the serving BS to the terminal, a connection request message to instruct the terminal to connect to the one or more BSs, which is activated according to the activation request message, using the at least one specific RAT.

2. The method of claim 1, further comprising:
   receiving, by the serving BS from the terminal, a measurement report message with respect to the one or more neighbor BSs; and
   transmitting, by the serving BS to the control station, a report message with respect to the one or more neighbor BSs based on the measurement report message.

3. The method of claim 1, further comprising:
   determining the at least one specific RAT required for connecting the terminal and the one or more neighbor BSs.

4. The method of claim 3, wherein, the step of the determining the at least one specific RAT comprises:
   determining whether to additionally establish a new session between the one or more neighbor BSs and the terminal while an existing session which has been established between the serving BS and the terminal is maintained, or whether to transfer the existing session to the one or more neighbor BSs.

5. The method of claim 1, further comprising:
   transmitting, by the serving BS, a connection request message including information on the at least one specific RAT of the plurality of RATs that is to be used for a connection with the one or more neighbor BSs to the terminal; and
   receiving, by the serving BS, a connection response message including information on the at least one specific RAT.

6. The method of claim 1, further comprising:
   exchanging, by the serving BS, at least one of information on at least one RAT supportable by the serving BS or by the terminal and information on at least one RAT preferred by the serving BS or by the terminal.

7. A serving base station (BS), comprising:
   a transceiver; and
   a controller configured to control the transceiver to:
   receive information on a plurality of radio access technologies (RATS) which are supported and have been activated or deactivated by one or more neighbor BSs,
   transmit an activation request message to activate at least one specific RAT of the plurality of RATs which has been deactivated by the one or more neighbor BSs if the serving BS requires to activate the at least one specific RAT thereby connecting a terminal to the one or more neighbor BSs,
   receive an activation response message including information on the one or more neighbor BSs and information on the at least one specific RAT after being activated according to the activation request message, and
   transmit a connection request message to instruct the terminal to connect to the one or more BSs, which is activated according to the activation request message, using the at least one specific RAT.

* * * * *